(12) United States Patent
Hwang et al.

(10) Patent No.: US 12,090,627 B2
(45) Date of Patent: Sep. 17, 2024

(54) METHOD AND SYSTEM FOR CONTROLLING ROBOT ARM FOR PERFORMING COFFEE DRIP

(71) Applicant: XYZ, Inc., Seoul (KR)

(72) Inventors: Sung Jae Hwang, Seongnam-si (KR); Jong Keun Lee, Seoul (KR); Dong Jin Kim, Seoul (KR)

(73) Assignee: XYZ, Inc., Seoul (KR)

( * ) Notice: Subject to any disclaimer, the term of this patent is extended or adjusted under 35 U.S.C. 154(b) by 687 days.

(21) Appl. No.: 17/370,034

(22) Filed: Jul. 8, 2021

(65) Prior Publication Data

US 2021/0331325 A1    Oct. 28, 2021

Related U.S. Application Data

(63) Continuation of application No. PCT/KR2020/007422, filed on Jun. 8, 2020.

(30) Foreign Application Priority Data

Jun. 13, 2019    (KR) ........................ 10-2019-0070010

(51) Int. Cl.
*A47J 44/00*    (2006.01)
*A47J 31/00*    (2006.01)
(Continued)

(52) U.S. Cl.
CPC ......... *B25J 11/0045* (2013.01); *A47J 31/002* (2013.01); *A47J 31/02* (2013.01);
(Continued)

(58) Field of Classification Search
CPC ...... A47J 31/06; A47J 31/4403; A47J 31/446; A47J 31/0631; A47J 31/0636; A47J 31/02;
(Continued)

(56) References Cited

U.S. PATENT DOCUMENTS

2017/0011442 A1    1/2017   Hu et al.
2019/0387919 A1*  12/2019   Huang ................ A47J 31/4425
(Continued)

FOREIGN PATENT DOCUMENTS

CN    106361154 A    2/2017
CN    106473603 A    3/2017
(Continued)

OTHER PUBLICATIONS

International Search Report of PCT/KR2020/007422 dated Nov. 27, 2020.
Hotelex {Hand-washing robot (robot arm) Bubble Lab}, online article, Mar. 30, 2016.

*Primary Examiner* — Reginald Alexander
(74) *Attorney, Agent, or Firm* — Dinsmore & Shohl LLP; Yongsok Choi, Esq.

(57) ABSTRACT

A method of controlling a robot arm for performing coffee drip includes: an arrangement checking operation of checking an arrangement of a dripper, a coffee powder container, a cup, and a kettle; a coffee powder providing operation of, when the arrangement of the cup is sensed, gripping the coffee powder container and providing a coffee powder contained in the coffee powder container to the dripper, by using the robot arm; a dripping operation of, when the coffee powder is provided to the dripper, gripping the kettle and performing a drip operation using any one of a plurality of predetermined methods, by using the robot arm; and a discharging operation of, when the dripping operation is completed, gripping the cup and transferring the cup to a discharge position.

18 Claims, 9 Drawing Sheets

(51) Int. Cl.
    *A47J 31/02*     (2006.01)
    *B25J 9/16*     (2006.01)
    *B25J 11/00*     (2006.01)
    *B25J 13/08*     (2006.01)
    *A47J 31/06*     (2006.01)
    *A47J 31/44*     (2006.01)

(52) U.S. Cl.
    CPC ............. *A47J 44/00* (2013.01); *B25J 9/1664* (2013.01); *B25J 9/1697* (2013.01); *B25J 13/089* (2013.01); *A47J 31/0631* (2013.01); *A47J 31/446* (2013.01)

(58) Field of Classification Search
    CPC .......... A47J 31/42; A47J 44/00; G06Q 20/18; G06Q 20/203
    USPC ................................................... 99/282, 283
    See application file for complete search history.

(56) References Cited

U.S. PATENT DOCUMENTS

2020/0205603 A1*   7/2020   Chen ...................... A47J 31/525
2020/0337493 A1*  10/2020   Chen ........................ A47J 31/56
2020/0375388 A1*  12/2020   MacFarlane ....... G06Q 20/3224

FOREIGN PATENT DOCUMENTS

| | | | |
|---|---|---|---|
| EP | 3088141 A2 | 11/2016 | |
| JP | 2006346063 A | 12/2006 | |
| KR | 1020130040271 | * 2/2013 | ............. A47J 31/02 |
| KR | 101695133 B1 | 1/2017 | |
| KR | 101978718 B1 | 5/2019 | |
| WO | 2018225925 A1 | 12/2018 | |

* cited by examiner

METHOD AND SYSTEM FOR CONTROLLING ROBOT ARM FOR PERFORMING COFFEE DRIP

CROSS-REFERENCE TO RELATED APPLICATIONS

This application is a continuation of International Application No. PCT/KR2020/007422 filed on Jun. 8, 2020, which claims priority to Korean Patent Application No. 10-2019-0070010 filed on Jun. 13, 2019, the entire contents of which are herein incorporated by reference.

BACKGROUND

1. Field

The present disclosure relates to a method and a system for controlling a robot arm for performing coffee drip. More particularly, the present disclosure relates to a method and a system for controlling a robot arm that simultaneously drips various coffee by using a coffee drip tool such as a dripper, a coffee powder container, a cup, and a kettle through various drip algorithms.

2. Description of the Related Art

With the development of robot technology, technology in which an unmanned robot makes and transfers food or beverages has been developed. For example, in a case of making coffee, a robot that automatically performs roasting, blending, grinding, and espresso extraction from raw green beans and puts the prepared coffee in a cup and moves the coffee to a desired position has been developed.

As described above, currently, the robot for making coffee has been developed to the extent that the espresso extracted from an espresso machine is simply mixed with water and milk. However, a robot capable of making a hand drip coffee by filtering a coffee powder, which is a basic coffee making method, has not yet been developed. Because the taste of the hand drip coffee varies according to a drip method, a uniform taste of the hand drip coffee cannot be guaranteed. Also, in general, hand drip coffee provided from a store takes a long time to make, and it is difficult to make a large amount of hand drip coffee at the same time.

SUMMARY

The present disclosure provides a control method and a control system for making coffee by using an unmanned robot so as to guarantee a uniform taste of hand drip coffee, which varies in taste whenever the coffee is made.

The present disclosure provides a control method and system capable of rapidly and accurately making a large amount of hand drip coffee at the same time.

These objectives are not limited to the above-mentioned contents, and other technical problems that are not mentioned herein may be clearly understood by those of skill in the art from the following description.

According to an embodiment of the present disclosure, a method of controlling a robot arm for performing coffee drip includes an arrangement checking operation of checking an arrangement of at least one of a dripper, a coffee powder container, a cup, and a kettle, a coffee powder providing operation of gripping the coffee powder container and providing a coffee powder contained in the coffee powder container to the dripper, by using the robot arm, a dripping operation of, when the coffee powder is provided to the dripper, gripping the kettle and performing a drip operation using any one of a plurality of predetermined methods, by using the robot arm, and a discharging operation of, when the dripping operation is completed, gripping the cup and transferring the cup to a discharge position.

An arrangement of each of the dripper, the coffee powder container, the cup, and the kettle may be sensed through at least one of a presence of an object at an arrangement position and a weight of the object.

The method may further include a dripper transfer operation, in which the robot arm grips the dripper and transfers the dripper to a dripper arrangement unit, and the dripper arrangement unit may be located vertically above an arrangement unit of the cup.

The coffee powder providing operation may include a first dropping operation of dropping the coffee powder by vertically rotating the coffee powder container gripped by the robot arm, and a second dropping operation in which the robot arm performs an upward and downward motion at least once in a state in which the robot arm grips the coffee powder container in a rotated state.

In the second dropping operation, a downward motion of the upward and downward motion may include a stop motion in a state in which the robot arm is accelerated.

The method may further include a rinsing operation of, when an arrangement of the cup in an arrangement unit of the cup is sensed, gripping, by the robot arm, the kettle and pouring water onto the dripper.

The method may further include a grounds removing operation of, when the cup is sensed in the discharge position, gripping, by the robot arm, the dripper, moving the dripper to a predetermined position, and discharging a content in the dripper by rotating the dripper in a vertical direction.

A position at which the dripper, the coffee powder container, and the cup are arranged and discharged at at least one position, and, when the cup arranged in the arrangement checking operation comprises a plurality of cups, the robot arm may simultaneously perform a plurality of coffee drip processes.

The dripping operation may include a first drip motion of tilting, by the robot arm, the kettle to allow water in the kettle to flow out of the kettle, a second drip motion of performing, by the robot arm, a spiral rotation motion while performing the first drip motion, and a third drip motion of performing, by the robot arm, a rotation motion while performing the first drip motion, the rotation motion being obtained by combining a first circular motion with a second circular motion, and a diameter of the first circular motion being less than a diameter of the second circular motion.

The dripping operation may include an operation of, when a temperature of water in the kettle exceeds 90 degrees, performing, by the robot arm, the second drip motion at least once using at least 35 milliliters (mL) of water and waiting at least 30 seconds, an operation of, when the temperature of the water in the kettle is greater than 86 degrees and less than or equal to 88 degrees, performing, by the robot arm, the second drip motion at least once using at least 120 mL of the water and waiting at least 10 seconds, an operation of, when the temperature of the water in the kettle is greater than 84 degrees and less than or equal to 86 degrees, performing, by the robot arm, the second drip motion at least once using at least 80 mL of the water and waiting at least 10 seconds, and an operation of, when the temperature of the water in the kettle is less than or equal to 84 degrees, performing, by the robot arm, the first drip motion at least once using at least 60 mL of the water.

The dripping operation may include an operation of, when a temperature of water in the kettle exceeds 90 degrees, performing, by the robot arm, the second drip motion at least once using at least 35 mL of water and waiting at least 30 minutes, an operation of, when the temperature of the water in the kettle is greater than 86 degrees and less than or equal to 88 degrees, performing, by the robot arm, the third drip motion at least once using at least 120 mL of the water and waiting at least 10 seconds, an operation of, when the temperature of the water in the kettle is greater than 84 degrees and less than or equal to 86 degrees, performing, by the robot arm, the third drip motion at least once using at least 80 mL of the water and waiting at least 10 seconds, and an operation of, when the temperature of the water in the kettle is less than or equal to 84 degrees, performing, by the robot arm, the first drip motion at least once using at least 60 mL of the water.

The dripping operation may include controlling at least one of a slope at which the robot arm is inclined, a timing at which the robot arm is inclined, and a duration for which the robot arm is inclined, based on analysis of an image in which the coffee powder of the dripper swells.

The gripping of the kettle by the robot arm may include inserting a handle of the kettle into a groove provided in the robot arm.

According to an embodiment of the present disclosure, a robot arm control system for performing coffee drip includes an arrangement unit configured to arrange a dripper, a coffee powder container, a cup, and a kettle, a sensing unit configured to sense an arrangement of the dripper, the coffee powder container, the cup, and the kettle in the arrangement unit, and a robot arm configured to grip the dripper, the coffee powder container, the cup, or the kettle according to a control signal of a processing unit based on the sensing of the sensing unit, and perform a coffee drip process by performing a dripping operation using one of a plurality of predetermined drip methods stored in a memory unit.

The sensing unit may be further configured to sense an arrangement in the arrangement unit through at least one of a presence of an object in the arrangement unit and a weight sensing of the object.

The robot arm may be further configured to discharge a coffee powder by rotating the gripped coffee powder container in a vertical direction, and perform an upward and downward motion at least once while gripping the coffee powder container in a rotated state.

A downward motion of the upward and downward motion may include a stop motion while the robot arm is accelerated.

The robot arm may be further configured to simultaneously perform a plurality of coffee drip processes when the cup arranged in the arrangement unit includes a plurality of cups.

The dripping operation may include a first drip motion of tilting, by the robot arm, the kettle to allow water in the kettle to flow out of the kettle, a second drip motion of performing, by the robot arm, a spiral rotation motion while performing the first drip motion, and a third drip motion of performing, by the robot arm, a circular motion while performing the first drip motion, the circular motion being obtained by combining a first circular motion with a second circular motion, and a diameter of the first circular motion being less than a diameter of the second circular motion.

The dripping operation may include an operation of, when a temperature of water in the kettle exceeds 90 degrees, performing, by the robot arm, the second drip motion at least once using at least 35 mL of water and waiting at least 30 seconds, an operation of, when the temperature of the water in the kettle is greater than 86 degrees and less than or equal to 88 degrees, performing, by the robot arm, the second drip motion at least once using at least 120 mL of the water and waiting at least 10 seconds, an operation of, when the temperature of the water in the kettle is greater than 84 degrees and less than or equal to 86 degrees, performing, by the robot arm, the second drip motion at least once using at least 80 mL of the water and waiting at least 10 seconds, and an operation of, when the temperature of the water in the kettle is less than or equal to 84 degrees, performing, by the robot arm, the first drip motion at least once using at least 60 mL of the water.

The dripping operation may include, sequentially, an operation of, when a temperature of water in the kettle exceeds 90 degrees, performing, by the robot arm, the second drip motion at least once using at least 35 mL of water and waiting at least 30 seconds, an operation of, when the temperature of the water in the kettle is greater than 86 degrees and less than or equal to 88 degrees, performing, by the robot arm, the third drip motion at least once using at least 120 mL of the water and waiting at least 10 seconds, an operation of, when the temperature of the water in the kettle is greater than 84 degrees and less than or equal to 86 degrees, performing, by the robot arm, the third drip motion at least once using at least 80 mL of the water and waiting at least 10 seconds, and an operation of, when the temperature of the water in the kettle is less than or equal to 84 degrees, performing, by the robot arm, the first drip motion at least once using at least 60 mL of the water.

The robot arm control system may further include an image capturing unit configured to photograph an inside of the dripper, and the processing unit may be configured to perform image analysis of an image obtained by the photographing of the image capturing unit, and control at least one of a slope at which the robot arm is inclined, a timing at which the robot arm is inclined, and a duration for which the robot arm is inclined, based on the analysis of an image in which a coffee powder of the dripper swells.

The gripping of the kettle by the robot arm may include inserting a handle of the kettle into a groove provided in the robot arm.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
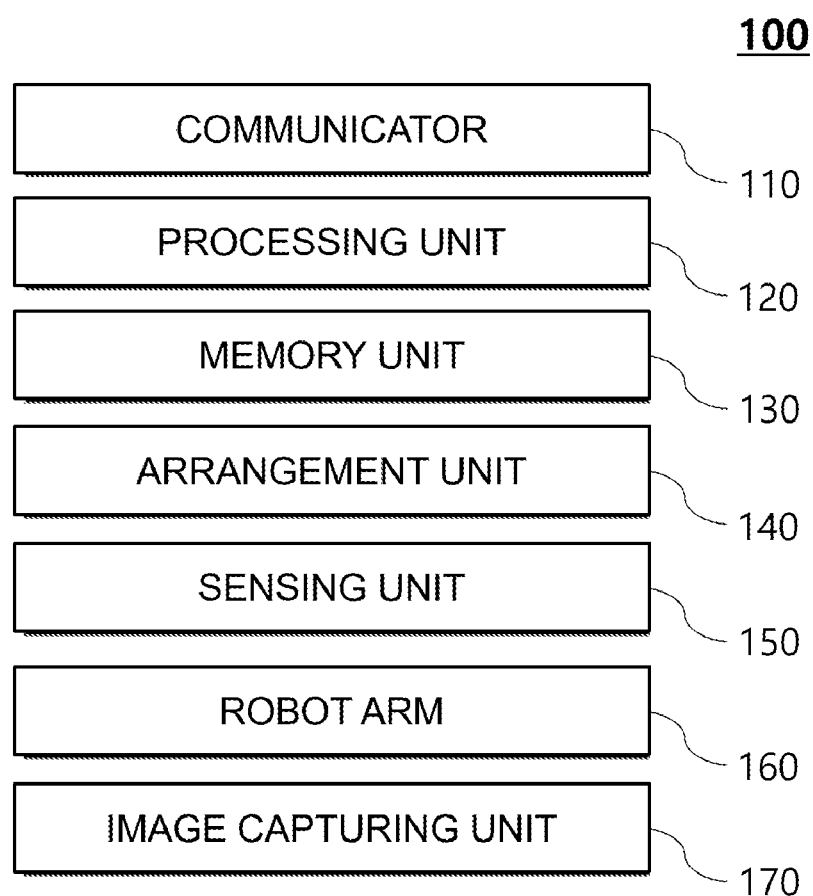
FIG. 1 is a block diagram of a robot arm control system for performing coffee drip according to an embodiment of the present disclosure.

One or more embodiments of the present disclosure will be described below in more detail with reference to the accompanying drawings so that those of skill in the art may easily work the embodiments of the present disclosure. However, the present disclosure may have various different forms and configuration and is not limited to the embodiments described herein. In addition, in order to clearly explain the embodiments of the present disclosure in the drawings, parts that are not related to description is omitted.

The terms used herein are used to illustrate specific embodiments only, and are not intended to limit the present disclosure. An expression used in the singular encompasses an expression of the plural unless the context expressly indicates otherwise.

In the present disclosure, terms such as "comprise", "have", or "include" are intended to indicate that features, numbers, operations, components, parts, or combinations thereof described in the present disclosure are present, and it can be understood that the present or additional possibility of one or more other features, numbers, operations, components, parts, or combinations thereof is not excluded in advance.

In addition, elements shown in embodiments of the present disclosure are independently shown to represent different characteristic functions, and it does not mean that each of the elements is configured by separate hardware or one software unit. That is, for convenience of description, each component is described by listing each component, and at least two components among the respective components may be combined to form one component, or one component may be divided into a plurality of components to perform a function. An integrated embodiment and a separated embodiment of each component are included in the scope of the present disclosure without departing from the spirit and scope of the present disclosure.

In addition, the following embodiments are provided to more clearly describe an ordinary knowledge in the art, and shapes and sizes of elements in the drawings may be exaggerated for more clear description.

Hereinafter, embodiments of the present disclosure will be described with reference to the accompanying drawings.

Figure 2:
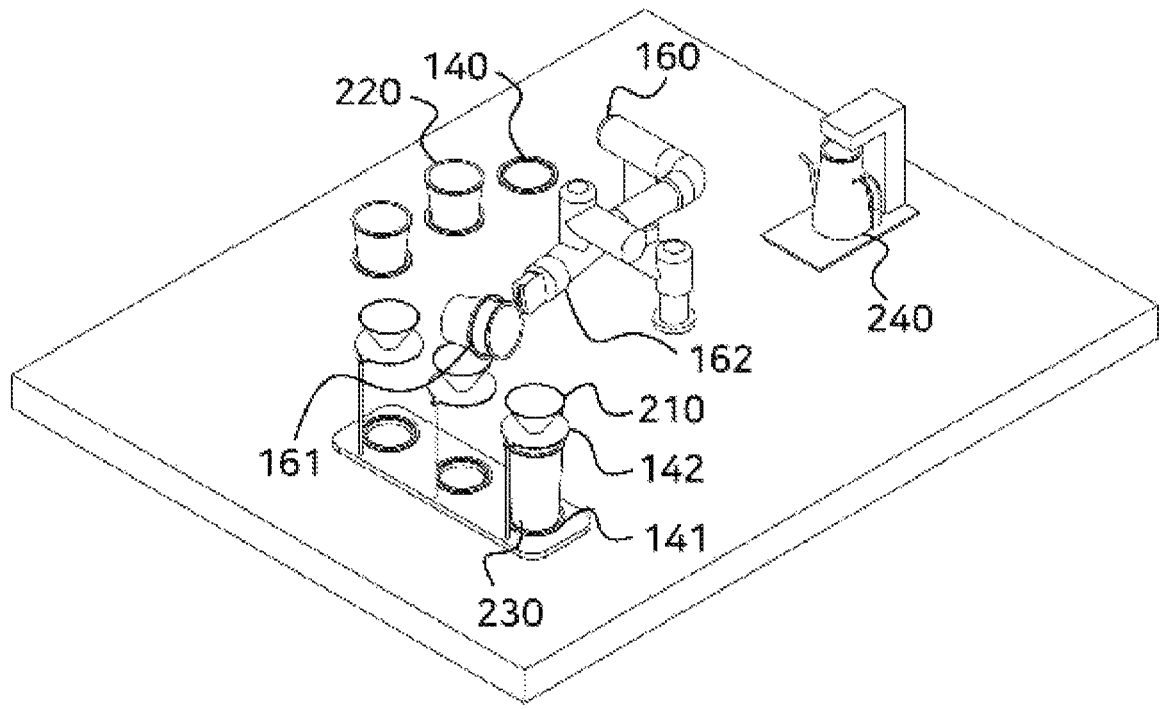
FIG. 2 illustrates a process in which a robot arm performs coffee drip according to a coffee drip process, according to an embodiment of the present disclosure.

FIG. 1 is a block diagram of a robot arm control system for performing coffee drip according to an embodiment of the present disclosure, and FIG. 2 illustrates a process in which a robot arm performs coffee drip according to a coffee drip process according to an embodiment of the present disclosure.

Referring to FIGS. 1 and 2, a robot arm control system 100 for performing coffee drip may include a communicator 110, a processing unit 120, a memory unit 130, an arrangement unit 140, a sensing unit 150, a robot arm 160, and an image capturing unit 170, and some components may be omitted or additional components may be added as necessary.

The communicator 110 is configured to receive necessary information from an external server or an external apparatus, or transmit obtained information to the external server or the external apparatus, and the network may be a wired or wireless network. Also, the network may include a network to which an external apparatus and the robot arm apparatus 1000 are directly connected, or may be a private network generated by a repeater. The network may include a communication network that is a high-speed backbone network of a large-sized communication network capable of large-capacity, long-distance voice, and data service, and may be a next-generation wired/wireless network for providing an Internet or a high-speed multimedia service. When the network is a wireless communication network, the network may include cellular communication or near field communication. For example, the cellular communication may include at least one of long-term evolution (LTE), LTE advanced (LTE-A), $5^{th}$ generation (5G), code division multiple access (CDMA), wideband CDMA (WCDMA), universal mobile telecommunications system (UMTS), wireless broadband (WiBro), and global system for mobile communications (GSM). The near field communication may include at least one of wireless fidelity (Wi-Fi), Bluetooth, Zigbee, and near field communication (NFC). However, the communication method is not limited thereto and may include a technology of wireless communication that will be developed in the future.

The processing unit 120 is configured to process a movement and gripping control operation of a robot arm to perform a coffee drip, or determine a risk level according to a situation occurring while the coffee drip is being performed, control a movement of the robot arm based on the determined risk level, and perform various processes related to image processing, and recognition. For example, the processing unit 120 may include a central processing unit (CPU), an application processor (AP), and the like, and may include a memory therein to store commands or data related to at least one other element, or may access necessary information by communicating with the memory unit 130 in the apparatus or an external memory if necessary.

The memory unit 130 may store data received or generated by the robot arm control system 100. Also, commands or data related to at least one other element may be stored. For example, the memory unit 130 may include a hard disk drive, a solid state drive, flash memory, or any other suitable storage apparatus including dynamic memory such as static random-access memory (SRAM) and dynamic random-access memory (DRAM). An algorithm of performing coffee drip, an operation of controlling the robot arm 160, and various information required may be stored in the memory unit 130. The data stored in the memory unit 130 may be accessed and read from the processing unit 120 as necessary.

The arrangement unit 140 may have a structure in which a dripper 210, a coffee powder container 220, a cup 230, and a kettle 240 may be arranged. The arrangement unit 140 may be provided in plural, and the dripper 210, the coffee powder container 220, the cup 230, and the kettle 240 may be provided with different arrangement units 140 that may be independently arranged from one another. In an embodiment of the present disclosure, the arrangement unit 140 may include a cup arrangement unit 141 and a dripper arrangement unit 142. In addition, the arrangement unit 140 may be formed to correspond to a shape of each of the dripper 210, the coffee powder container 220, the cup 230, and the kettle 240. For example, the arrangement unit 140 of the cup 230 may include a seating surface on which a bottom surface of the cup 230 may be seated, and a step formed along a circumference of the seating surface to prevent the cup 230 from collapsing. In addition, a groove may be formed on the seating surface to correspond to the cup 230 having a support portion that comes into contact with the bottom surface and supports the body of the cup, such as a paper cup. In addition, the arrangement unit 140 may emit a magnetic field so that the dripper 210, the coffee powder container 220, the cup 230, and the kettle 240 are stably seated. In this case, the arrangement unit 140 may include a magnetic force generating unit capable of generating a magnetic field or an object having magnetic properties. The dripper 210, the coffee powder container 220, the cup 230, and the kettle 240 may be formed of a metal material that reacts to a magnetic force, or a magnetic object may be attached thereto.

The sensing unit 150 may be configured to sense whether the dripper 210, the coffee powder container 220, the cup 230, and the kettle 240 are arranged in the arrangement unit 140. According to an embodiment of the present disclosure, the sensing unit 150 may sense whether the dripper 210, the coffee powder container 220, the cup 230, and the kettle 240 are arranged on the arrangement unit 140 using at least one of a presence of an object in the arrangement unit 140 and a weight sensing of the object. For example, the presence of the object in the arrangement unit 140 may be sensed by using an infrared sensor, an ultrasonic sensor, an image sensor, or the like, or an electronic scale may be provided in the arrangement unit 140 to detect a weight of an object arranged in the arrangement unit 140, and when the weight exceeds a predetermined reference weight, it may be sensed that the object is arranged in the arrangement unit 140. In addition, the sensing unit 150 may sense whether an object is arranged in the arrangement unit 140 by sensing both of the presence of the object in the arrangement unit 140 and the weight of the object.

The robot arm 160 may grip the dripper 210, the coffee powder container 220, the cup 230, and the kettle 240 according to a control signal of the processing unit 120 based on an arrangement sensing by the sensing unit 150, and may perform a coffee drip process using any one of a plurality of predetermined drip methods stored in the memory unit 130. Here, the robot arm 160 may include a grip unit 161 and an arm unit 162 in an embodiment of the present disclosure, and a detailed form or arrangement method thereof may be variously changed according to an embodiment of the present disclosure. The grip unit 161 may grip an object under the control of the processing unit 120. In an embodiment of the present disclosure, the object to be gripped may include the dripper 210, the coffee powder container 220, the cup 230, and the kettle 240. The arm unit 162 may move or rotate the grip unit 161 so that the grip unit 161 may easily grip the object. The arm unit 162 may include a plurality of joints, and the joints may operate to roll, pitch, and yaw the respective arms coupled to the joints.

The image capturing unit 170 may be configured to capture an image requiring analysis so that the processing unit 120 may analyze the image and transmit the captured image to the processing unit 120. Also, the image capturing unit 170 may be coupled as a component of the robot arm 160, or may be provided as being separate from the robot arm 160 at a position independent from the robot arm 160. For example, the image capturing unit 170 may include a small camera capable of photographing an object such as a cup and a surrounding object, or a depth camera such as a stereo camera capable of measuring a distance. The processing unit 120 may generate a control signal to perform the coffee drip process by analyzing the image received from the image capturing unit 170. Also, the processing unit 120 may determine a risk level based on whether an object such as a person is present around the robot arm 160 and a distance from the object, and may stop a movement of the robot arm 160 or reduce a movement speed of the robot arm 160 when the determined risk level exceeds a predetermined reference. For example, when a person approaches the vicinity of the robot arm, a distance from the person may be calculated, and when the distance from the person is close to a predetermined reference value and hot coffee or water is contained in a cup gripped by the robot arm, the risk level may be determined to be high based on information on contents in the cup gripped by the robot arm. In addition, in order to reduce the risk level, a movement path and a movement area of the robot arm 160 may be changed to be distant from the object.

Figure 3:
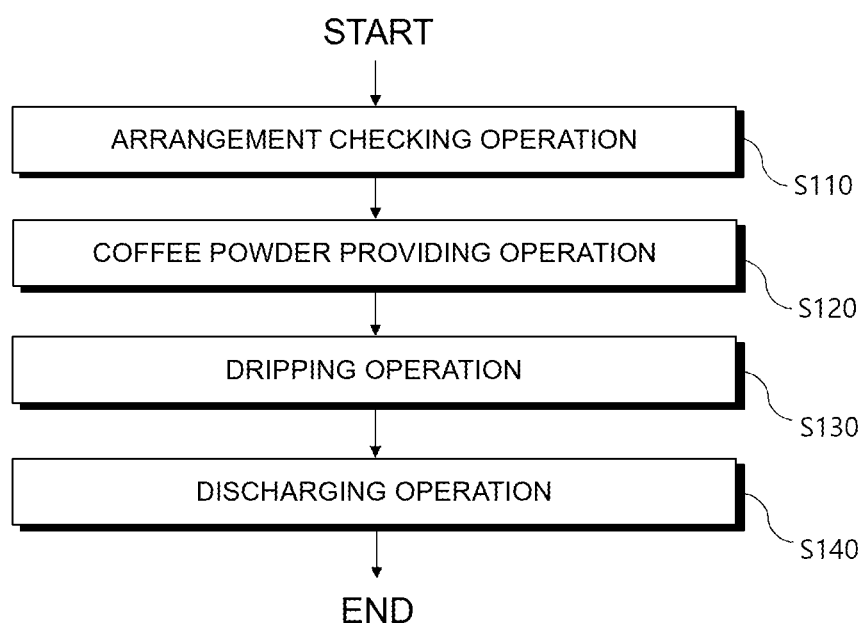
FIG. 3 is a flowchart of a method of controlling a robot arm to perform coffee drip according to an embodiment of the present disclosure.

FIG. 3 is a flowchart of a method of controlling a robot arm to perform coffee drip according to an embodiment of the present disclosure.

Referring to FIGS. 2 and 3, the method of controlling the robot arm to perform coffee drip according to an embodiment of the present disclosure may include an arrangement checking operation S110, a coffee powder providing operation S120, a dripping operation S130, and a discharging operation S140.

The arrangement checking operation S110 may include checking whether the dripper 210, the coffee powder container 220, the cup 230, and the kettle 240 are arranged in the arrangement unit 140. The sensing of the arrangement of the dripper 210, the coffee powder container 220, the cup 230, and the kettle 240 in the arrangement unit 140 may be performed by the sensing unit using at least one of a presence of an object and a weight sensing. The arrangement unit 140 and a discharge position may be provided in at least one. When a plurality of cups 230 are arranged in the arrangement checking operation S110, the robot arm 160 may simultaneously perform a plurality of coffee drip processes. By performing the plurality of coffee drip processes at the same time, different drip methods are performed with the same coffee beans, thereby providing coffee with various tastes.

In a cup transfer operation, when the arrangement of the dripper 210, the coffee powder container 220, the cup 230, and the kettle 240 in the arrangement unit 140 is sensed, the robot arm 160 grips the cup and transfers the cup to the arrangement unit 140. The cup arrangement unit 141 may be located a lower end portion of the dripper arrangement unit 142 on which the dripper 210 is arranged, so that coffee extracted from the dripper 210 may flow into the cup.

The coffee powder providing operation S120 is an operation in which the robot arm 160 grips the coffee powder container 220 and provides the coffee powder contained in the coffee powder container 220 to the dripper 210. After the robot arm 160 grips the coffee powder container 220 and moves the coffee powder container 220 to an upper portion of the dripper 210, the grip unit 161 gripping the dripper 210 is rotated to allow the coffee powder of the coffee powder container 220 to flow out to the dripper 210.

In the dripping operation S130, when the coffee powder is provided to the dripper 210, the robot arm 160 grips the kettle 240 and performs a dripping operation using any one of a plurality of predetermined drip methods. Here, the dripping operation may include a first drip motion, a second drip motion, and a third drip motion, and a detailed description of each operation will be described later below. In addition, in the dripping operation S130, an image of the inside of the dripper 210 may be analyzed. By controlling at least one of a slope at which the robot arm 160 is inclined, a timing at which the robot arm 160 is inclined, and a duration for which the robot arm 160 is inclined by analyzing an image in which the coffee powder of the dripper 210 swells during the dripping process, a speed, an amount, and a timing of pouring of the water provided to the dripper 210 may be controlled.

The image analysis may be performed by the processing unit 120 shown in FIG. 1, and the processing unit 120 may generate a control signal for controlling the above-described slope, timing, or duration based on a result of the image analysis.

In the discharging operation S140, when the dripping operation of the robot arm is completed, the robot arm transfers the cup containing the extracted coffee to the discharge position. The discharge position may be a preset position, and may vary according to an environment in which the robot arm system is installed.

Figure 4:
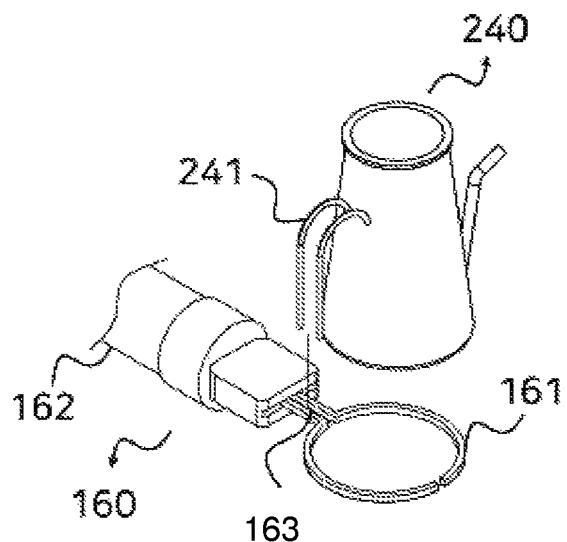
FIG. 4 illustrates a state in which a robot arm grips a kettle, according to an embodiment of the present disclosure.

FIG. 4 illustrates a state in which a robot arm grips a kettle, according to an embodiment of the present disclosure.

Referring to FIG. 4, a grip of the kettle 240 of the robot arm 160 according to an embodiment of the present disclosure may include inserting a handle 241 of the kettle 240 into the groove 163 provided in the robot arm 160. The groove 163 may be provided in the grip unit 161 or may be naturally formed by the grip unit 161. By inserting the handle 241 of the kettle 240 into the groove 163, the robot arm 160 may grip the kettle 240 like a person and stably pour the water of the kettle 240. The gripping form of the kettle 240 of the robot arm 160 shown in FIG. 4 is only an example, and thus, the kettle 240 may be gripped in various ways using the grip unit 161 as long as the kettle 240 may be gripped by using the grip unit 161.

Figure 5:
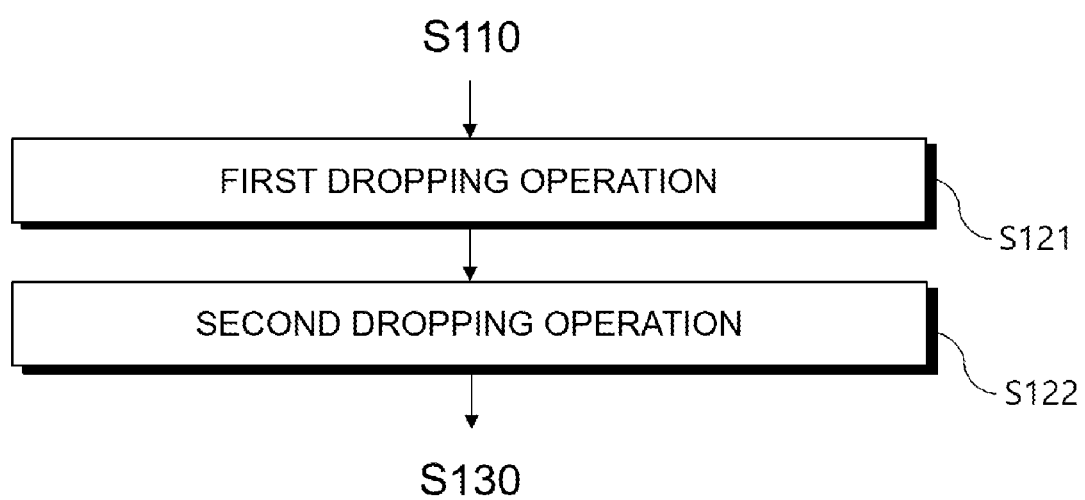
FIG. 5 is a detailed flowchart of a coffee powder providing operation according to an embodiment of the present disclosure.
Figure 6:
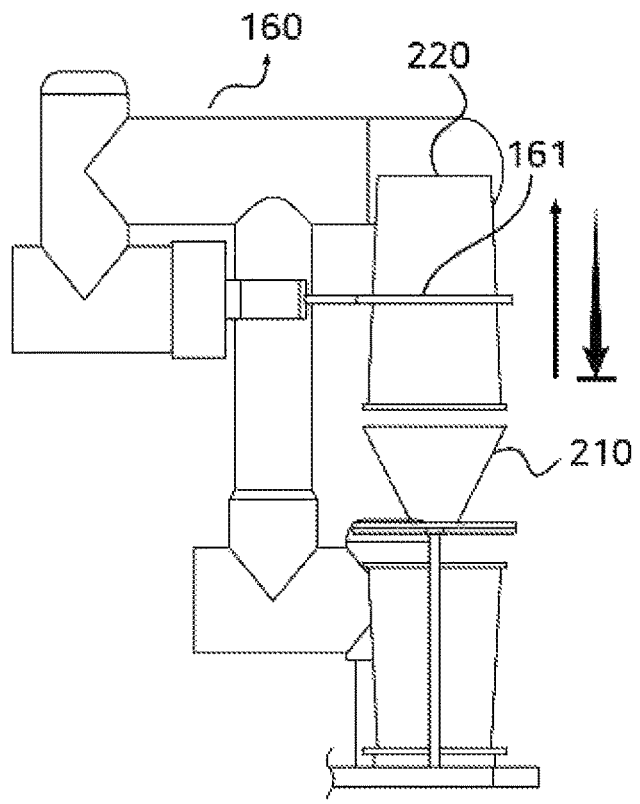
FIG. 6 illustrates an operation of providing coffee powder according to an embodiment of the present disclosure.

FIG. 5 is a detailed flowchart of a coffee powder providing operation according to an embodiment of the present disclosure, and FIG. 6 illustrates a coffee powder providing operation according to an embodiment of the present disclosure.

Referring to FIGS. 5 and 6, the coffee powder providing operation S120 may include a first dropping operation S121 and a second dropping operation S122.

The first dropping operation S121 includes an operation of dropping the coffee powder by rotating the coffee powder container 220 gripped by the robot arm 160 in a vertical direction. Here, the vertical rotation means that an opened inlet of the coffee powder container 220 is rotated toward the dripper 210, that is, toward the floor, and the coffee powder may be naturally dropped by gravity.

The second dropping operation S122 may include an operation in which the robot arm 160 performs an upward and downward motion at least once while gripping the coffee powder container 220 in the rotated state. In the second dropping operation S122, the remaining coffee powder stuck in the coffee powder container 220 that is not dropped may also be provided to the dripper 210. In addition, in the second dropping operation S122, a downward motion of the upward and downward motion may include a stop motion in a state in which the robot arm 160 is accelerated. When the robot arm 160 gripping the coffee powder container 220 performs a downward motion, if the robot arm 160 is stopped while accelerating, that is, if the robot arm 160 suddenly stops during acceleration, the remaining coffee powders in the coffee powder container 220 may be separated from the container due to inertia. Accordingly, the remaining coffee powder may be more effectively provided to the dripper 210.

Figure 7:
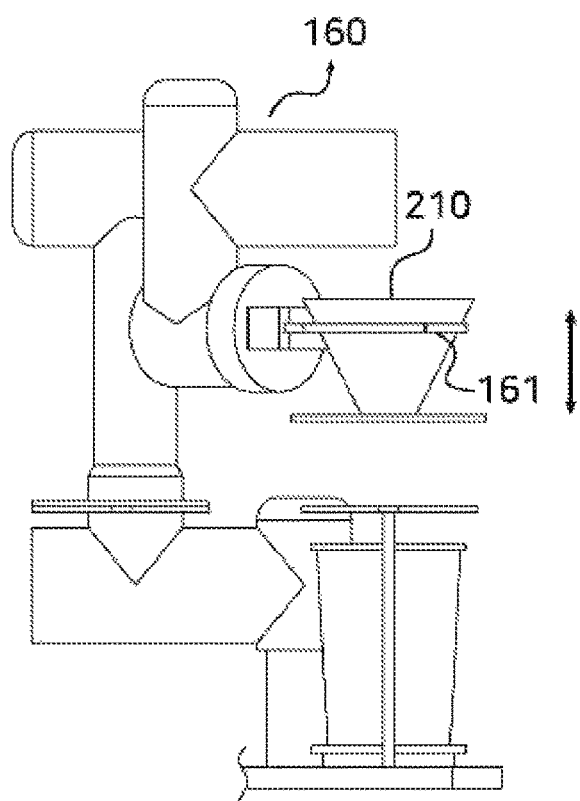
FIG. 7 illustrates a state in which coffee powder of a dripper is planarized, according to an embodiment of the present disclosure.

FIG. 7 illustrates a state in which coffee powder of a dripper is planarized, according to an embodiment of the present disclosure.

Referring to FIG. 7, after the coffee powder providing operation S120, the robot arm 160 may grip and shake the dripper 210 so that the coffee powder in the dripper 210 is flattened. In the coffee powder providing operation S120, the coffee powder shape may not be suitable for drip, such as a dune or a groove may be formed according the shape of coffee powder provided to or dropped in the dripper 210. Therefore, for a coffee powder shape suitable for coffee drip, the robot arm 160 may grip the dripper 210 to move left and right or up and down so that the coffee powder becomes flat.

Figure 8:
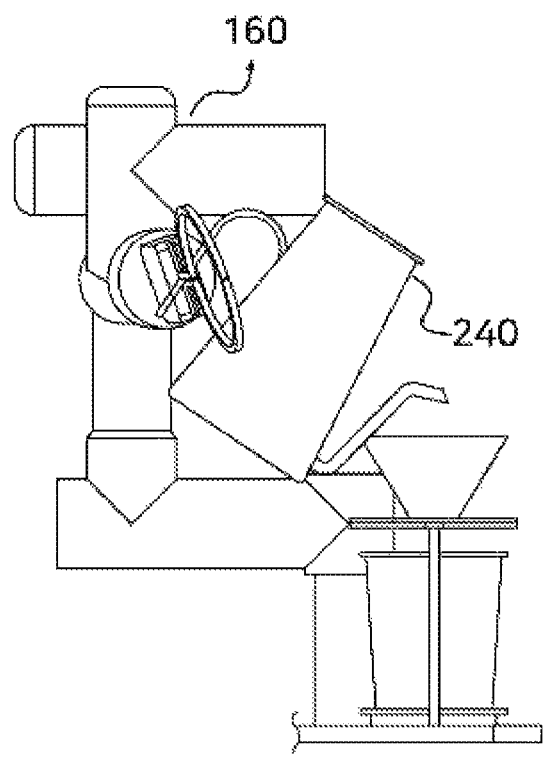
FIG. 8 illustrates a first drip motion according to an embodiment of the present disclosure.
Figure 9A:
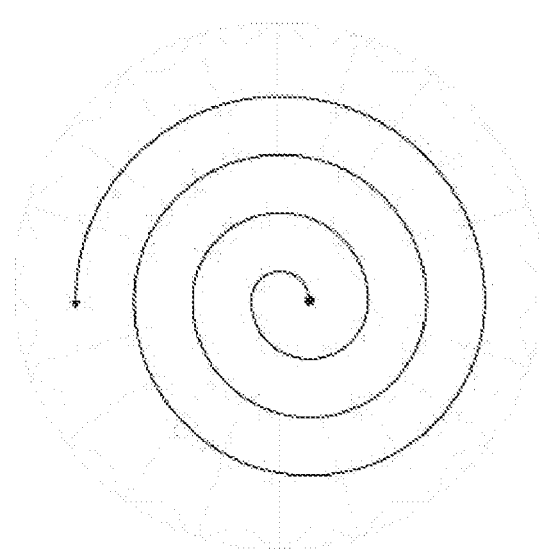
FIGS. 9A and 9B illustrate a second drip motion and a third drip motion trajectory according to an embodiment of the present disclosure of the present disclosure.
Figure 9B:
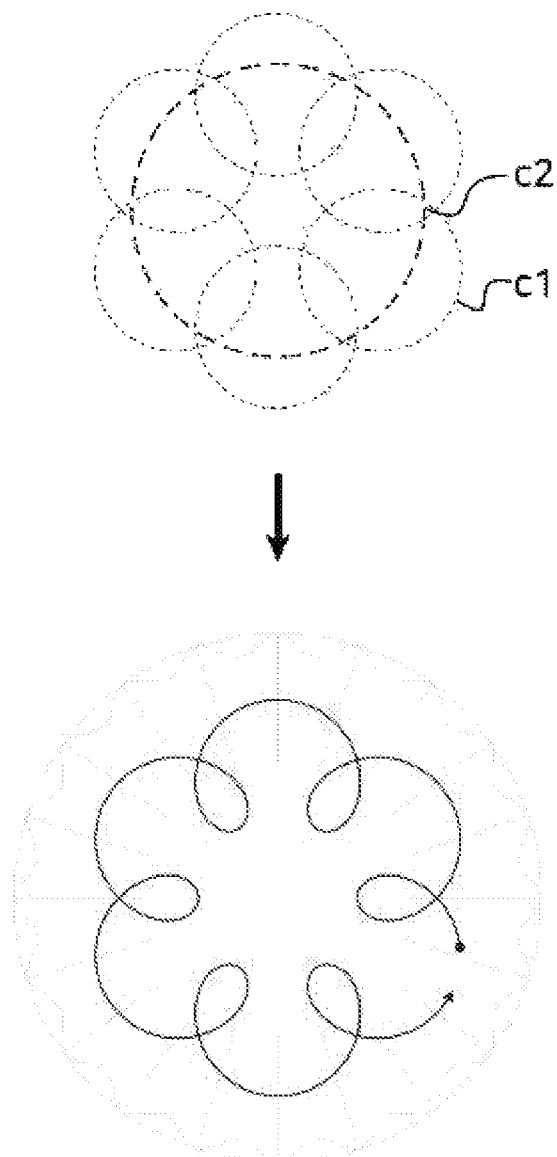

FIG. 8 illustrates a first drip motion according to an embodiment of the present disclosure, and FIGS. 9A and 9B illustrate trajectories of a second drip motion and a third drip motion according to an embodiment of the present disclosure.

Referring to FIGS. 8, 9A, and 9B, a dripping operation of the dripping operation S130 according to an embodiment may include a first drip motion, a second drip motion, and a third drip motion.

The first drip motion may include an operation in which the robot arm 160 tilts the kettle 240 so that water in the kettle 240 flows out of the kettle 240. The second drip motion may include performing a spiral rotation motion while performing the first drip motion.

In this case, the spiral rotation motion may be in a direction in which a screw moves from the center of the inside of the dripper 210 to the outside. The third drip motion may include an operation of performing, by the robot arm, a circular motion obtained by combining a first circular motion c1 with a second circular motion c2 while performing the first drip motion, and a diameter of the first circular motion c1 being less than a diameter of the second circular motion c2. A combined motion of the first circular motion c1 and the second circular motion c2 of the third drip motion may have a flower shape as shown in FIG. 9B.

Figure 10:
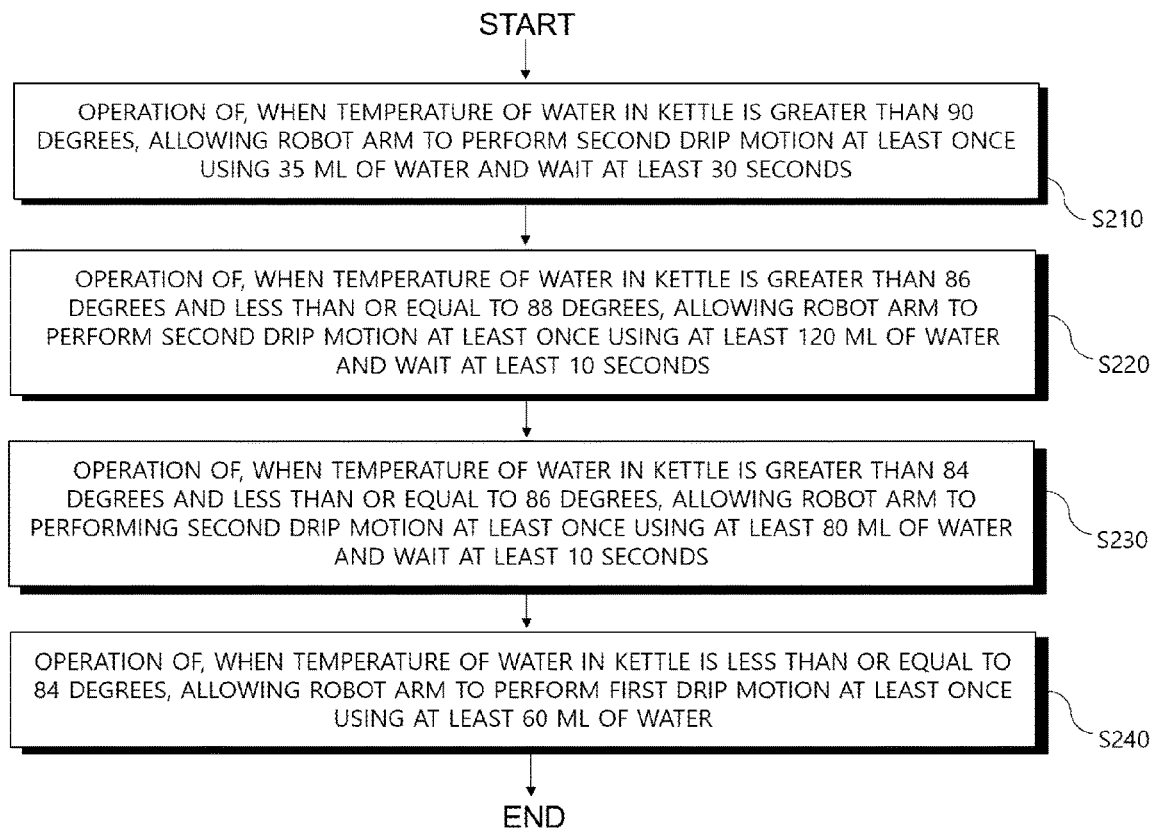
FIGS. 10 and 11 are flowcharts of a method of performing a drip, according to an embodiment of the present disclosure.

FIG. 10 is a flowchart of a drip method according to an embodiment of the present disclosure.

Referring to FIG. 10, a drip method according to an embodiment of the present disclosure may include an operation in which a robot arm waits at least 30 seconds after at least one second drip motion using water of at least 35 mL when a temperature of water in a kettle is greater than 90 degrees (S210), an operation in which the robot arm waits at least 10 seconds after at least one second drip motion using water of at least 120 mL when the temperature of water in the kettle is greater than 86 degrees and less than or equal to 88 degrees (S220), an operation in which the robot arm waits at least 10 seconds after at least one second drip motion using water of at least 80 mL when the temperature of water in the kettle is greater than 84 degrees and less than or equal to 86 degrees (S230), and an operation in which the robot arm performs at least one first drip motion using water of at least 60 mL when the temperature of water in the kettle is less than or equal to 84 degrees (S240). The drip method shown in FIG. 10 may provide stirring effects by spirally moving water in the early part of the extraction in a thick and rapid manner. Thus, the coffee may have a variety of beautiful tastes.

Figure 11:
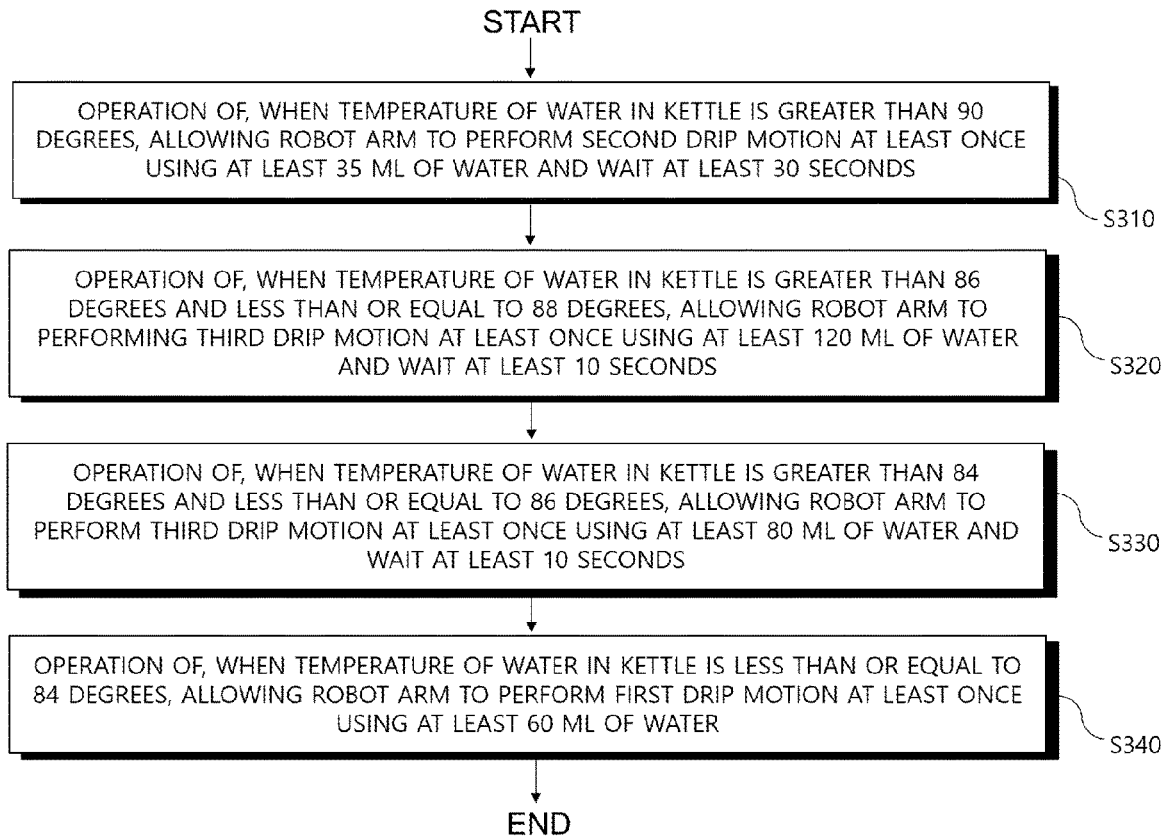

FIG. 11 is a flowchart of a drip method according to an embodiment of the present disclosure.

Referring to FIG. 11, a drip method according to an embodiment of the present disclosure may include an operation in which a robot arm waits at least 30 seconds after at least one second drip motion using water of at least 35 mL when a temperature of water in a kettle is greater than 90 degrees (S310), an operation in which the robot arm waits at least 10 seconds after at least one third drip motion using water of at least 120 mL when the temperature of water in the kettle is greater than 86 degrees and less than or equal to 88 degrees (S320), an operation in which the robot arm waits at least 10 seconds after at least one third drip motion using water of at least 80 mL when the temperature of water in the kettle is greater than 84 degrees and less than or equal to 86 degrees (S330), and an operation in which the robot arm performs at least one first drip motion using water of at least 60 mL when the temperature of water in the kettle is less than or equal to 84 degrees (S340). The drip method shown in FIG. 11 may maximally extract a detailed and complex taste of a highest grade coffee.

Figure 12:
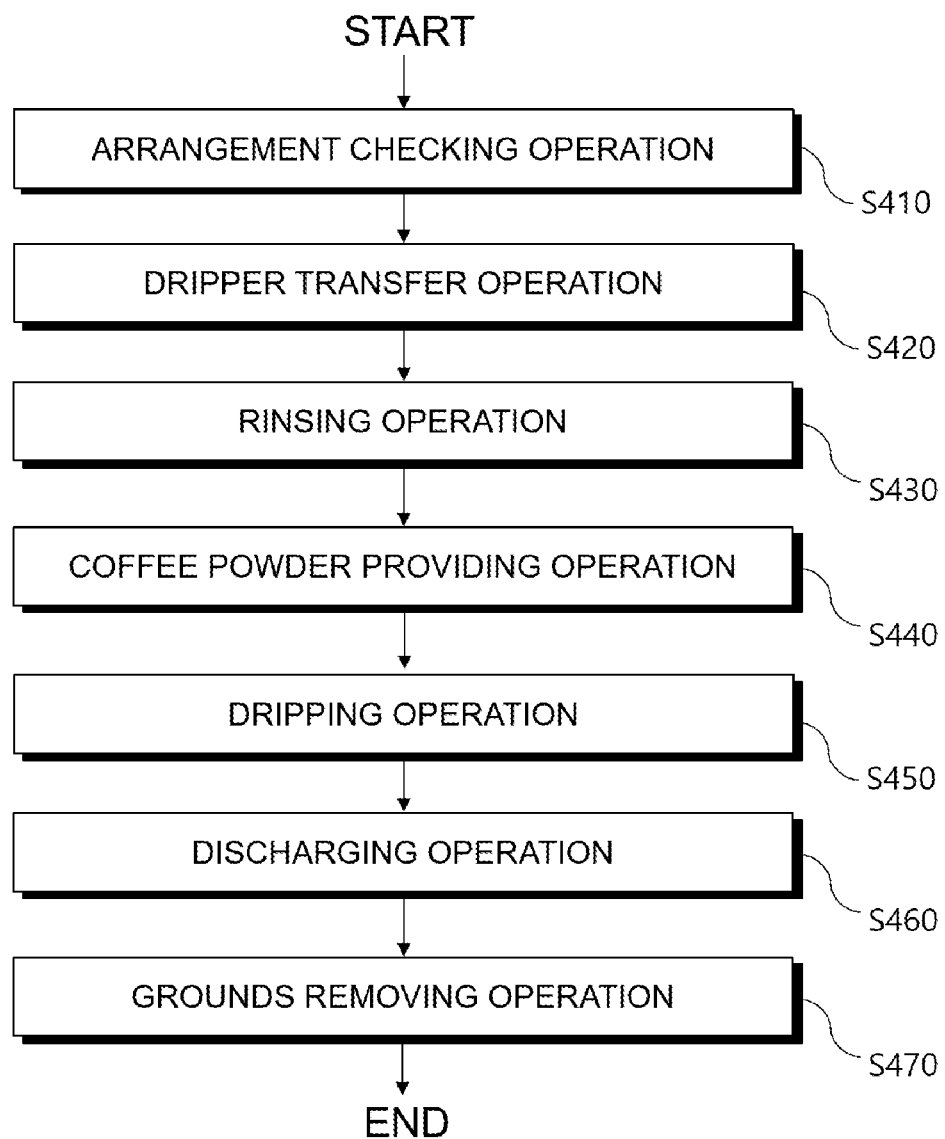
FIG. 12 is a flowchart of a method of controlling a robot arm to perform coffee drip according to an embodiment of the present disclosure.

FIG. 12 is a flowchart of a robot arm control method to perform coffee drip according to an embodiment of the present disclosure.

Referring to FIG. 12, a robot arm control method according to an embodiment of the present disclosure may include an arrangement checking operation S410, a dripper transfer operation S420, a rinsing operation S430, a coffee powder providing operation S440, a dripping operation S450, a discharging operation S460, and a grounds removing operation S470.

Here, the arrangement checking operation S410, the coffee powder providing operation S440, the dripping operation S450, and the discharging operation S460 are the same as the arrangement checking operation S110, the coffee powder providing operation S120, the dripping operation S130, and the discharging operation S140 described with reference to FIG. 3, and thus, a description thereof will be omitted.

The dripper transfer operation S420 may include an operation in which the robot arm grips a dripper and transfer the dripper to a dripper arrangement unit. Here, referring to FIG. 2, an initial position of the dripper 210 may not be the dripper arrangement unit 142 as shown in FIG. 2. In this case, the dripper transfer operation S420 may include an operation of transferring the dripper 210 to the dripper arrangement unit 142. Here, the dripper arrangement unit 142 may exist vertically above the cup arrangement unit 141.

The rinsing operation S430 may include an operation in which, when an arrangement of the cup 230 in the cup arrangement unit 141 of FIG. 2 is sensed, the robot arm 160 grips the kettle 240 and pours water onto the dripper 210. In the rinsing operation S430, pulp flavor of filtering paper of the dripper 210 may be removed.

The grounds removing operation S470 may include an operation in which, when a cup is sensed at a discharge position, the robot arm grips the dripper, moves the dripper to a predetermined position, and rotates the dripper in a vertical direction to drop contents in the dripper. Here, the predetermined position may be provided with a wastebasket in which the contents in the dripper may be discarded. In addition, the contents in the dripper may include a remaining filter paper after the coffee drip is performed and coffee grounds in the filter paper. In the grounds removing operation S470, the grounds inside the dripper may be automatically removed to allow a robot arm to immediately enter a standby mode for a next coffee drip process.

Various embodiments described herein may be implemented by hardware, middleware, microcode, software, and/or any combinations thereof. For example, various embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or any combinations thereof.

Also, for example, various embodiments may be recorded on or encoded in a computer-readable medium including instructions. The computer-readable medium or encoded instructions may cause a programmable processor or other processor to perform a method, for example, when the instructions are executed. The computer-readable medium includes both a computer storage medium and a communication medium including any medium that facilitates transfer of a computer program from one place to another. The storage medium may be any available medium that can be accessed by a computer. For example, such computer-readable medium may include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store desired program code in the form of instructions or data structures accessible by a computer.

Such hardware, software, firmware, etc. may be implemented in the same device or in separate devices to support various operations and functions described herein. In addition, in the present disclosure, the elements, units, modules, and components described as " . . . unit" may be implemented together in conjunction with each other, or may be individually implemented as logic devices that are separate but interoperable. The description of different features for modules, units, etc. is intended to emphasize different functional embodiments and does not necessarily mean that they should be realized by individual hardware or software components. Rather, the functionality associated with one or more modules or units may be performed by individual hardware or software components or incorporated into common or individual hardware or software components.

The present disclosure provides a control method and a control system for making coffee to ensure a uniform taste of a hand drip coffee that may vary in taste whenever the coffee is made.

The present disclosure provides a control method and system capable of rapidly and accurately manufacturing a large amount of hand drip coffee at the same time.

The effects of the present disclosure are not limited to the above-mentioned contents, and other unmentioned effects will be clearly understood by those of skill in the art from the following description.

Although operations are shown in the drawings in a specific order, it should not be construed that these operations are performed in the specific order shown, or in sequential order shown to achieve a desired result, or that all of the shown operations need to be performed. Under an arbitrary environment, multitasking and parallel processing may be advantageous. Furthermore, it should be construed that the division of various components in the above-described embodiments is not required in all embodiments, and the described components may be generally integrated together as a single software product or packaged as a plurality of software products.

Although the present disclosure is described with reference to the embodiments illustrated in the drawings, it will be understood by those of skill in the art that various modifications and other equivalent embodiments are possible. Therefore, the true technical scope of protection of the present disclosure should be determined according to the technical spirit of the following claims.

What is claimed is:

1. A robot arm control system for performing coffee drip, the robot arm control system comprising:
   an arrangement unit configured to arrange a dripper, a coffee powder container, a cup, and a kettle;
   a sensing unit configured to sense an arrangement of the dripper, the coffee powder container, the cup, and the kettle in the arrangement unit; and
   a robot arm configured to grip the dripper, the coffee powder container, the cup, or the kettle according to a control signal of a processing unit based on the sensing of the sensing unit, and perform a coffee drip process by performing a dripping operation using one of a plurality of predetermined drip methods stored in a memory unit,
   wherein the sensing unit is further configured to sense an arrangement in the arrangement unit through at least one of a presence of an object in the arrangement unit and a weight sensing of the object.

2. The robot arm control system of claim 1, wherein the robot arm is further configured to discharge a coffee powder by rotating the gripped coffee powder container in a vertical direction, and perform an upward and downward motion at least once while gripping the coffee powder container in a rotated state.

3. The robot arm control system of claim 2, wherein a downward motion of the upward and downward motion includes a stop motion while the robot arm is accelerated.

4. The robot arm control system of claim 1, wherein the robot arm is further configured to simultaneously perform a plurality of coffee drip processes when the cup arranged in the arrangement unit comprises a plurality of cups.

5. The robot arm control system of claim 1, wherein the dripping operation comprises:
   a first drip motion of tilting, by the robot arm, the kettle to allow water in the kettle to flow out of the kettle;
   a second drip motion of performing, by the robot arm, a spiral rotation motion while performing the first drip motion; and
   a third drip motion of performing, by the robot arm, a circular motion while performing the first drip motion, the circular motion being obtained by combining a first circular motion with a second circular motion, and a diameter of the first circular motion being less than a diameter of the second circular motion.

6. The robot arm control system of claim 1, further comprising an image capturing unit configured to photograph an inside of the dripper,
   wherein the processing unit is configured to perform image analysis of an image obtained by the photographing of the image capturing unit, and control at least one of a slope at which the robot arm is inclined, a timing at which the robot arm is inclined, and a duration for which the robot arm is inclined, based on analysis of an image in which a coffee powder of the dripper swells.

7. A method of controlling a robot arm for performing coffee drip, the method comprising:
   an arrangement checking operation of checking an arrangement of at least one of a dripper, a coffee powder container, a cup, and a kettle;
   a coffee powder providing operation of gripping the coffee powder container and providing a coffee powder contained in the coffee powder container to the dripper, by using the robot arm;
   a dripping operation of, when the coffee powder is provided to the dripper, gripping the kettle and performing a drip operation using any one of a plurality of predetermined methods, by using the robot arm; and
   a discharging operation of, when the dripping operation is completed, gripping the cup and transferring the cup to a discharge position,
   wherein an arrangement of each of the dripper, the coffee powder container, the cup, and the kettle is sensed through at least one of a presence of an object at an arrangement position and a weight of the object.

8. The method of claim 7, further comprising a dripper transfer operation, in which the robot arm grips the dripper and transfers the dripper to a dripper arrangement unit,
   wherein the dripper arrangement unit is located vertically above an arrangement unit of the cup.

9. The method of claim 7, wherein the coffee powder providing operation comprises:
   a first dropping operation of dropping the coffee powder by vertically rotating the coffee powder container gripped by the robot arm; and
   a second dropping operation, in which the robot arm performs an upward and downward motion at least once in a state in which the robot arm grips the coffee powder container in a rotated state.

10. The method of claim 9, wherein, in the second dropping operation, a downward motion of the upward and downward motion includes a stop motion in a state in which the robot arm is accelerated.

11. The method of claim 7, further comprising a rinsing operation of, when an arrangement of the cup is sensed in an arrangement unit of the cup, gripping, by the robot arm, the kettle and pouring water onto the dripper.

12. The method of claim 7, further comprising a grounds removing operation of, when the cup is sensed in the discharge position, gripping, by the robot arm, the dripper, moving the dripper to a predetermined position, and discharging a content in the dripper by rotating the dripper in a vertical direction.

13. The method of claim 7, wherein a position at which the dripper, the coffee powder container, and the cup are arranged and discharged at at least one position, and,
   when the cup arranged in the arrangement checking operation comprises a plurality of cups, the robot arm simultaneously performs a plurality of coffee drip processes.

14. The method of claim 7, wherein the dripping operation comprises:
   a first drip motion of tilting, by the robot arm, the kettle to allow water in the kettle to flow out of the kettle;
   a second drip motion of performing, by the robot arm, a spiral rotation motion while performing the first drip motion; and
   a third drip motion of performing, by the robot arm, a rotation motion while performing the first drip motion, the rotation motion being obtained by combining a first circular motion with a second circular motion, and a diameter of the first circular motion being less than a diameter of the second circular motion).

15. The method of claim 14, wherein the dripping operation comprises:
- an operation of, when a temperature of water in the kettle exceeds 90 degrees, performing, by the robot arm, the second drip motion at least once using at least 35 mL of water and waiting at least 30 seconds;
- an operation of, when the temperature of the water in the kettle is greater than 86 degrees and less than or equal to 88 degrees, performing, by the robot arm, the second drip motion at least once using at least 120 mL of the water and waiting at least 10 seconds;
- an operation of, when the temperature of the water in the kettle is greater than 84 degrees and less than or equal to 86 degrees, performing, by the robot arm, the second drip motion at least once using at least 80 mL of the water and waiting at least 10 seconds; and
- an operation of, when the temperature of the water in the kettle is less than or equal to 84 degrees, performing, by the robot arm, the first drip motion at least once using at least 60 mL of the water.

16. The method of claim 14, wherein the dripping operation comprises:
- an operation of, when a temperature of water in the kettle exceeds 90 degrees, performing, by the robot arm, the second drip motion at least once using at least 35 mL of water and waiting at least 30 minutes;
- an operation of, when the temperature of the water in the kettle is greater than 86 degrees and less than or equal to 88 degrees, performing, by the robot arm, the third drip motion at least once using at least 120 mL of the water and waiting at least 10 seconds;
- an operation of, when the temperature of the water in the kettle is greater than 84 degrees and less than or equal to 86 degrees, performing, by the robot arm, the third drip motion at least once using at least 80 mL of the water and waiting at least 10 seconds; and
- an operation of, when the temperature of the water in the kettle is less than or equal to 84 degrees, performing, by the robot arm, the first drip motion at least once using at least 60 mL of the water.

17. The method of claim 7, wherein the dripping operation comprises controlling at least one of a slope at which the robot arm is inclined, a timing at which the robot arm is inclined, and a duration for which the robot arm is inclined, based on analysis of an image in which the coffee powder of the dripper swells.

18. The method of claim 7, wherein the gripping of the kettle by the robot arm comprises inserting a handle of the kettle into a groove provided in the robot arm.

* * * * *